United States Patent
Koga

(10) Patent No.: US 8,684,642 B2
(45) Date of Patent: Apr. 1, 2014

(54) CUTTING INSERT, CUTTING TOOL, AND METHOD OF CUTTING WORKPIECE USING THE SAME

(75) Inventor: Kenichirou Koga, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 276 days.

(21) Appl. No.: 13/203,472

(22) PCT Filed: Feb. 24, 2010

(86) PCT No.: PCT/JP2010/052859
§ 371 (c)(1),
(2), (4) Date: Aug. 25, 2011

(87) PCT Pub. No.: WO2010/098345
PCT Pub. Date: Sep. 2, 2010

(65) Prior Publication Data
US 2012/0034041 A1 Feb. 9, 2012

(30) Foreign Application Priority Data
Feb. 26, 2009 (JP) .................................. 2009-043603

(51) Int. Cl.
*B23C 5/20* (2006.01)

(52) U.S. Cl.
USPC .............. 409/132; 407/113; 407/42; 407/115; 407/61

(58) Field of Classification Search
USPC ......... 407/113, 114, 115, 116, 34, 42, 53, 61, 407/58, 59, 60; 409/132, 131
See application file for complete search history.

(56) References Cited

U.S. PATENT DOCUMENTS

| | | | | |
|---|---|---|---|---|
| 3,701,187 A | * | 10/1972 | Erkfritz | 407/46 |
| RE30,908 E | * | 4/1982 | Friedline et al. | 407/114 |
| 4,729,697 A | * | 3/1988 | Lacey | 407/42 |
| 5,085,542 A | * | 2/1992 | Nakayama et al. | 407/114 |
| 5,221,164 A | * | 6/1993 | Allaire | 407/113 |

(Continued)

FOREIGN PATENT DOCUMENTS

| | | | |
|---|---|---|---|
| CN | 200984661 | | 12/2007 |
| CN | 101296771 | | 10/2008 |
| JP | 54124381 A | * | 9/1979 |
| JP | 59-136204 | | 9/1984 |
| JP | 62-168210 | | 10/1987 |
| JP | 2-53305 | | 4/1990 |
| JP | 9-136210 | | 5/1997 |
| JP | 11-235607 | | 8/1999 |
| JP | 2002-502711 | | 1/2002 |
| JP | 2006-110667 | | 4/2006 |
| JP | 2006305716 A | * | 11/2006 |
| JP | 2009-241212 | | 10/2009 |
| WO | WO 9311898 A1 | * | 6/1993 |

OTHER PUBLICATIONS

Wuxi Diesel Engine Works, "A Throwaway ω 80 Facing Cutter with a Chip Dividing Groove", 1994-2012 China Academic Journal Electronic Publishing House, http://www.cnki.net.

*Primary Examiner* — Daniel Howell
*Assistant Examiner* — Nicole N Ramos
(74) *Attorney, Agent, or Firm* — Volpe and Koenig, P.C.

(57) ABSTRACT

A cutting insert has an upper face, a lower face, a side face, an upper cutting edge, a lower cutting edge and a through hole. The upper face has a substantially polygonal shape. The side face has a first side face and a second side face. The first side face has at least one upper concave part and at least one lower concave part. The at least one upper concave part and the at least one lower concave part are separated from each other through a thick part being continuous along a width direction of the side face. The thick part has a curved region extending in the shape of a wave from one end to the other end in the width direction of the first side face in a side view.

19 Claims, 8 Drawing Sheets

(56) References Cited

U.S. PATENT DOCUMENTS

| | | | |
|---|---|---|---|
| 5,712,030 A * | 1/1998 | Goto et al. | 428/332 |
| 5,921,722 A * | 7/1999 | Paya et al. | 407/114 |
| 6,149,355 A * | 11/2000 | Fouquer et al. | 407/113 |
| 7,695,222 B2 * | 4/2010 | Omori et al. | 407/119 |
| 2008/0240880 A1 * | 10/2008 | Durand | 409/131 |
| 2008/0260476 A1 | 10/2008 | Ishida | |

* cited by examiner (a)

(b)

(a)

(b)

(a)

(b)

(c)

(a)

(b)

CUTTING INSERT, CUTTING TOOL, AND METHOD OF CUTTING WORKPIECE USING THE SAME

TECHNICAL FIELD

The present invention relates to a cutting insert, a cutting tool, and a method of cutting a workpiece using the same.

BACKGROUND ART

In cutting inserts (hereinafter referred to as "inserts" in some cases), it has conventionally been proposed to form a cutting edge in a projected and concave shape by disposing a groove part in a side face, from the viewpoint of reducing chip twining (for example, refer to Japanese Unexamined Utility Model Publication No. 2-53305).

However, the groove part in the conventional insert is formed to extend from the upper surface to the lower surface of the side surface. Therefore, the wall thickness of the insert, namely, the distance from a cross section, which includes the central axis of the insert and is parallel to the cutting edge, to the side face cannot be ensured continuously in the width direction of the side face, and hence there is a risk that the fracture resistance of the insert will deteriorate. In other words, by the presence of the groove part, the portion adjacent to the groove part is projected in a block shape extended from the upper surface to the lower surface of the side surface. There is also a risk that when cutting is performed by the cutting edge located at the end portion on the upper surface, the portion projected in the block shape will not withstand cutting stress, causing a fracture.

Hence, there is a need for an insert having low cutting resistance and excellent fracture resistance. Particularly, in the insert that employs a through hole (attachment hole) extending from the upper surface to the lower surface, the through hole contributes to a further decrease in the wall thickness of the insert. This requires further enhanced measures against the fracture resistance deterioration.

SUMMARY OF THE INVENTION

An object of the present invention is to provide the cutting insert and the cutting tool, which have low cutting resistance and excellent fracture resistance, as well as the method of cutting a workpiece using the same.

The cutting insert according to an embodiment of the present invention includes an upper face, a lower face, a side face located between the upper face and the lower face, an upper cutting edge located at the intersection of the upper face and the side face, and a lower cutting edge located at the intersection of the lower face and the side face. The side face includes at least one upper concave part which extends up to the upper face along a thickness direction, and divides the upper cutting edge into a plurality of divided upper cutting edges, and at least one lower concave part which extends up to the lower face along the thickness direction, and divides the lower cutting edge into a plurality of divided lower cutting edges. The aforementioned at least one upper concave part and the aforementioned at least one lower concave part are separated from each other through a thick part being continuous along the width direction of the side face.

The cutting tool according to an embodiment of the present invention includes the cutting insert, and a holder to which the cutting insert is attached.

The cutting tool according to other embodiment of the present invention includes a plurality of the cutting inserts; and a holder to which the plurality of cutting inserts are attached. Two of the plurality of cutting inserts are attached to the holder with their respective upper faces and their respective lower faces positioned oppositely.

The method of cutting a workpiece according to an embodiment of the present invention includes rotating the cutting tool; bringing the upper cutting edge or the lower cutting edge of the rotating cutting tool into contact with the surface of the workpiece; and separating the cutting tool from the workpiece.

In the cutting insert according to the embodiment of the present invention, the upper concave part and the lower concave part are separated from each other through the thick part being continuous along the width direction of the side face, thereby ensuring the wall thickness of the insert across the width direction of the side face. Consequently, the double-sided insert capable of cutting by using both the upper and lower faces has two effects, namely, the cutting resistance reduction by the concave parts (the upper and lower concave parts), and the fracture resistance improvement by the thick part.

PREFERRED EMBODIMENTS FOR CARRYING OUT THE INVENTION

<Cutting Insert>

An embodiment of the cutting insert according to the present invention is described in detail with reference to FIGS. 1 to 4.

Figure 1:
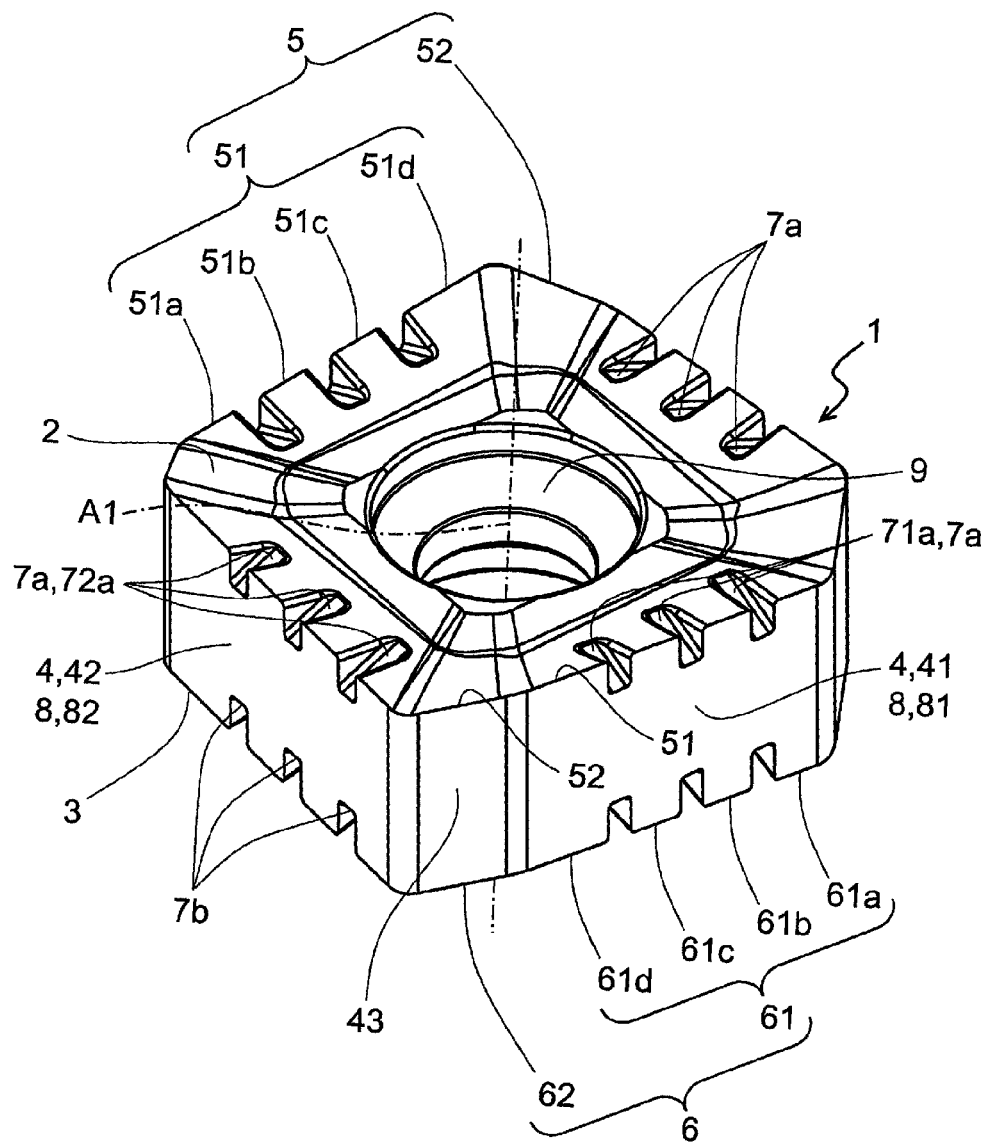
FIG. 1 is a general perspective view showing a cutting insert according to an embodiment of the present invention.
Figure 2:
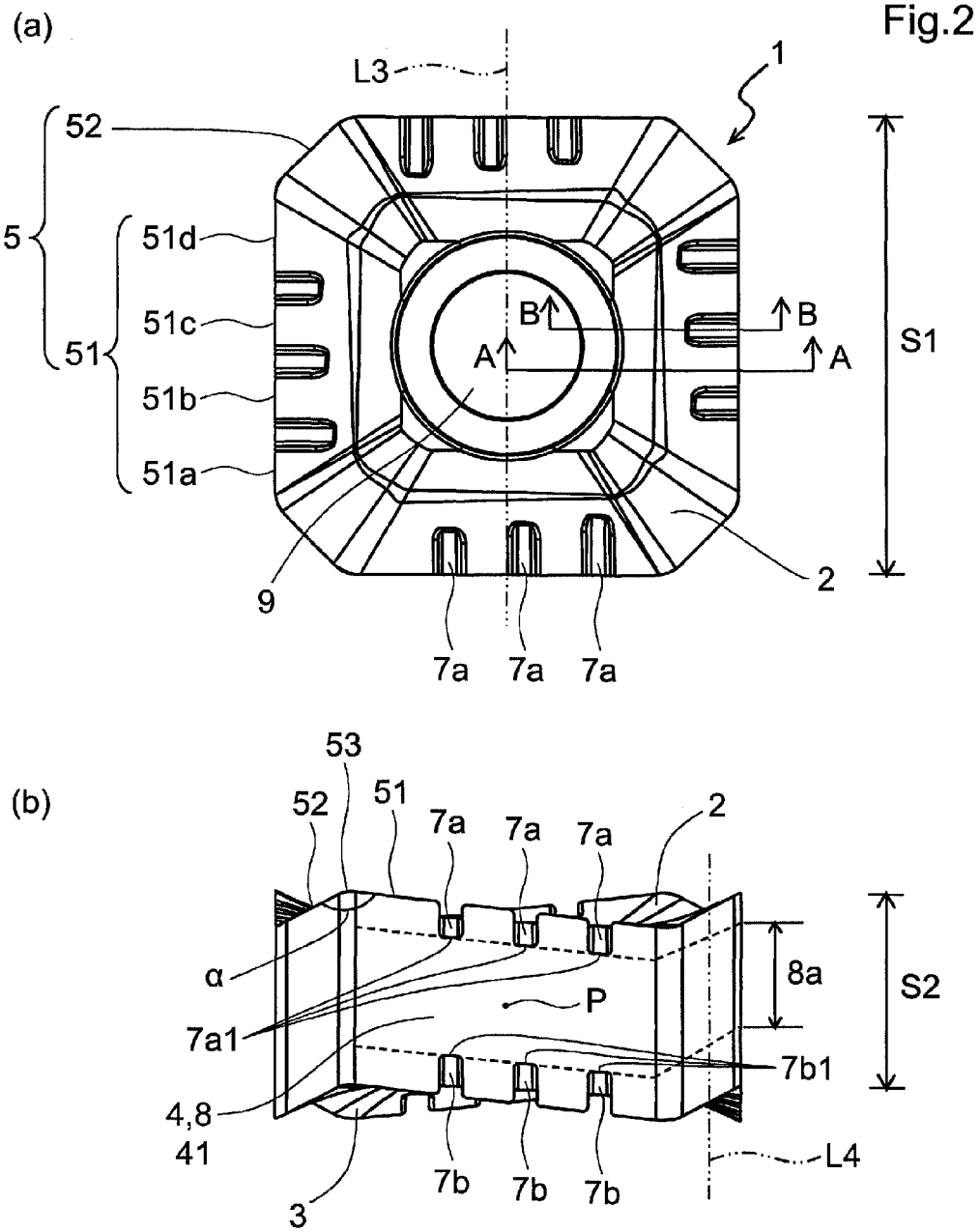
FIG. 2(a) is a top view of the cutting insert shown in FIG. 1.
FIG. 2(b) is a side view thereof.

As shown in FIGS. 1 and 2, the cutting insert 1 of the present embodiment roughly includes an upper face 2; a lower face 3; a side face 4 connected to the upper face 2 and the lower face 3; a through hole 9 extending from the upper face 2 to the lower face 3; an upper cutting edge 5 located at the intersection of the upper face 2 and the side face 4; and a lower cutting edge 6 located at the intersection of the lower face 3 and the side face 4. The side face 4 includes at least one upper concave part 7a which extends up to the upper face 2 along a thickness direction, and divides the upper cutting edge 5 into a plurality of divided upper cutting edges 51a to 51d; and at least one lower concave part 7b which extends up to the lower face 3 along the thickness direction, and divides the lower cutting edge 6 into a plurality of divided lower cutting edges 61a to 61d. At least one upper concave part 7a and at least one lower concave part 7b are separated from each other through a thick part 8 (side face reinforcing part) being continuous along a width direction. The thickness direction of the side face 4 denotes a direction parallel to the central axis of the insert 1. The width direction of the side face 4 denotes a direction perpendicular to the thickness direction. When viewed from the side, the condition of being continuous along the width direction of the side face 4 can be satisfied by being continuous in a direction to extend along the upper cutting edge 5 and the lower cutting edge 6.

This type of cutting insert 1 ensures the wall thickness of the insert 1 across the width direction of the side face. Consequently, the double-sided insert 1 capable of cutting by using both the upper and lower faces produces two effects, namely, the cutting resistance reduction by the concave parts (the upper concave part 7a and the lower concave part 7b), and the fracture resistance improvement by the thick part 8.

The insert 1 of the present embodiment includes a body part of a substantially polygonal plate shape. The body part includes the upper face 2 functioning as a rake face, the lower face 3 functioning as a seating face, and the side face 4 functioning as a flank face. As shown in FIG. 2, the insert 1 is a negative shaped insert allowing both the upper face 2 and the lower face 3 to be used as the rake face. Therefore, when the lower cutting edge 6 is used, the lower face 3 is used as the rake face, and the upper face 2 is used as the seating face. Hereinafter, the individual parts constituting the insert 1 are described in detail.

The body part may have any substantially polygonal shape, and no particular limitation is imposed thereon. When viewed from above, the body part may have a certain shape normally employed for the inserts by those skilled in the art, such as triangle, quadrangle, pentagon, hexagon, and octagon. The present embodiment employs a substantially quadrangular shape having four long sides. That is, the insert 1 is a four corner use insert. Therefore, the upper cutting edge 5 extends over the whole periphery of the upper face 2. In the shape of the body part, the sides thereof preferably have the same length each other, such as square and regular pentagon, from the viewpoint of using all the sides as the cutting edge. Regular pentagon is preferred in consideration of the advantage of disposing a large number of cutting edges, while ensuring the length of these cutting edges.

The rake face, whose thickness is gradually decreased from the upper cutting edge 5 and the lower cutting edge 6 to the inside, is formed on the upper face 2 and the lower face 3, respectively. A through hole 9 (attachment hole) extending from the upper face 2 to the lower face 3 is formed in a substantially mid portion of the upper face 2. The central axis of the through hole 9 is located at the same position as the central axis A1 of the body part. The through hole 9 is formed for the purpose of fixing the insert 1 to a holder 91 described later. That is, the insert 1 is fixed to the holder 91 by inserting an attachment screw 92 (fixing member) into the through hole 9, and by screwing it into the holder 91. In the insert 1 including the through hole 9 extending from the upper face 2 to the lower face 3, the through hole 9 can contribute to a decrease in the wall thickness of the insert 1. However, even in this type of insert 1, the fracture resistance deterioration can be effectively suppressed by including a thick part 8 described later.

In the insert 1, S1 and S2 have a relationship of S1>S2 where S1 is the minimum dimension of the upper face 2 on a third straight line L3 perpendicular to the central axis A1 when viewed from above, as shown in FIG. 2(a), and S2 is the minimum dimension of the side face 4 on a fourth straight line L4 parallel to the central axis A1 when viewed from the side, as shown in FIG. 2(b). Hereat, the S1 and the S2 are the dimensions from the same upper cutting edge 5. That is, the S1 corresponds to so-called depth of the insert 1, and the S2 corresponds to so-called thickness of the insert 1. This dimensional relationship relatively increases the wall thickness of the insert 1, thereby ensuring the fracture resistance of the insert 1. Additionally, the attachment stability of the insert 1 to the holder 91 is improved.

Preferably, the upper face 2 and the lower face 3 differ from each other in color. Specifically, when the body part is cemented carbide producing silver color, either the upper face 2 or the lower face 3 is preferably coated with, for example, titanium nitride (TiN) producing gold color. In the negative-shaped insert, both of the upper face and the lower face function as the rake face, and therefore the insert may be erroneously attached in some cases. By coating either the upper face or the lower face with TiN, the color of the TiN-coated face is different from the color of the uncoated face. Hence, these two faces can be clearly distinguished from each other, thereby reducing recognition error when attaching the insert. It is unnecessary to coat the entire face of either the upper face 2 or the lower face 3 as a target coating face. Similar effects are obtainable by coating, for example, a part of the target coating face (for example, a region other than the cutting edge) with TiN. The material used for the coating is not limited to TiN as long as it is possible to recognize a color difference between the upper face 2 and the lower face 3. For example, when the body part is cemented carbide, titanium carbon nitride (TiCN) producing light reddish brown color, titanium nitride aluminum (TiAlN) producing dark reddish brown color, or the like may be employed.

The upper cutting edge 5 includes a main cutting edge portion 51, and a sub cutting edge portion 52 formed continuously with the main cutting edge portion 51. More specifically, the upper face 2 is the substantially polygonal shape as described above. The side face 4 connected to the upper face 2 includes a first side face 41, and a second side face 42 adjacent to the first side face 41. The first side face 41 and the second side face 42 are both flat faces. The upper cutting edge 5 includes the main cutting portion 51 located at the intersection of the first side face 41 and the upper face 2, and the sub cutting portion 52 which is located at the intersection of a connecting side part 43 of the first side face 41 and the second side face 42, and the upper face 2, and is continuous with the main cutting portion 51. Similarly to the upper cutting edge 5, the lower cutting edge 6 also includes a main cutting edge portion 61 and a sub cutting edge portion 62. The constructions of the main cutting edge portion 61 and the sub cutting edge portion 62 are identical to those of the main cutting edge portion 51 and the sub cutting edge portion 52. Therefore, in the following description, the main cutting edge portion 51 and the sub cutting edge portion 52 are described.

The main cutting edge portion 51 plays a major role in chip generation during cutting action. The main cutting edge portion 51 includes divided upper cutting edges 51a to 51d (divided cutting edges) which are divided by a plurality of upper concave parts 7a disposed side by side in the side face 4. The sub cutting edge portion 52 is formed for the purpose of improving finished surface accuracy of a workpiece. The sub cutting edge portion 52 is formed at corner portions of the body part, and usually has a linear shape. In some cases, a rounded corner cutting edge is disposed between the main cutting edge portion 51 and the sub cutting edge portion 52. The main cutting edge portion 51 may be parallel to the main cutting edge portion 61, when viewed from the side. Similarly, the side cutting edge portion 52 may also be parallel to the sub cutting edge portion 62, when viewed from the side.

The main cutting edge portion 51 and the sub cutting edge portion 52 are respectively inclined with respect to a plane perpendicular to a vertical direction so that the main cutting edge portion 51 and the sub cutting portion 52 form a projected portion 53, as shown in FIG. 2(*b*). The projected portion 53 is useful in cutting into the workpiece at the beginning of cutting. From the viewpoint of allowing the projected portion 53 to make a point contact with the workpiece and smoothly cut thereinto, an angle α formed between the main cutting edge 51 and the sub cutting edge 52 is preferably an obtuse angle, when viewed from the side. Specifically, the angle α is preferably set in the range from 100 to 170 degrees.

The side face 4 is a plane perpendicular to the upper face 2 and the lower face 3. Hence, as compared to the insert whose side face and the upper face 2 or the lower face 3 forms a clearance angle, the wall thickness of the insert 1 can be further ensured, thus providing excellent fracture resistance. The side face 4 includes a plurality of divided side faces respectively connected to each of sides of the substantially polygonal shape of the upper face 2, and at least one upper concave part 7*a* is disposed in each of the plurality of divided side faces. Like a first side face 41 and a second side face 42 described later, each of the divided side faces mean each of side faces connected to each of sides of the upper face 2. As described above, in the insert 1 of the present embodiment, the upper concave part 7*a*, the lower concave part 7*b*, and the thick part 8 are formed in the side face 4, which are sequentially described below.

The upper concave part 7*a* is formed to divide the upper cutting edge 5, specifically the main cutting edge portion 51. Therefore, the chips generated by the main cutting edge portion 51 are divided into small pieces in the width direction thereof, thereby decreasing the cutting resistance during cutting. Consequently, chatter vibration and the cutting edge fracture during machining can be reduced, thus achieving excellent finished surface accuracy and a long tool life. The insert 1 including the main cutting edge portion 51 is particularly suitable for heavy-duty cutting.

The upper concave part 7*a* is formed to extend from the side face 4 to the upper face 2, and the lower concave part 7*b* is formed to extend from the side face 4 to the lower face 3. Both of the upper concave part 7*a* and the lower concave part 7*b* are in the shape of a groove having a substantially constant width, and are linear in the thickness direction. The plurality of upper concave parts 7*a* and the plurality of lower concave parts 7*b* are separated from one another, when viewed from the side. Thus, the thick part 8 that is continuous along the width direction can be formed between the upper concave part 7*a* and the lower concave part 7*b* in the side face 4, thereby achieving excellent fracture resistance.

These upper concave parts 7*a* and these lower concave parts 7*b* respectively have a lower end portion 7*a*1 and an upper end portion 7*b*1 which are located on the side face 4. Specifically, as shown in FIG. 2(*b*), the lower end portion 7*a*1 of each upper concave part 7*a* and the upper end portion 7*b*1 of each lower concave part 7*b* are both located on the first side face 41. In the insert of the present embodiment, when viewed from the side, the lower end portion 7*a*1 is located closer to the upper face 2 than the upper end portion 7*b*1. Accordingly, the thick part 8 that is relatively long in the thickness direction can be formed between the upper concave part 7*a* and the lower concave part 7*b* in the side face 4, thereby achieving more excellent fracture resistance.

These upper concave parts 7*a* and these lower concave parts 7*b* are suitably formed according to the angle at which the insert 1 is attached to the cutting tool. For example, in the case of having the rake face as in the present embodiment, these upper concave parts 7*a* and these lower concave parts 7*b* may be disposed horizontally from the rake face toward the side face 4. Alternatively, the bottoms of these upper concave parts 7*a* and these lower concave parts 7*b* may be inclined to come closer to the lower face 3 or the upper face 2 as they come closer to the side face 4. The lengths of these upper concave parts 7*a* and these lower concave parts 7*b* in the thickness direction may be set properly according to the feed per stroke of the cutting tool having the inserts 1 attached thereto.

The numbers of the upper concave parts 7*a* and the lower concave parts 7*b* may be set properly according to the kind of the workpiece used. Increasing the numbers of the upper concave parts 7*a* and the lower concave parts 7*b* will reduce the cutting resistance and the chatter vibration, but will decrease the cutting area. The numbers of the upper concave parts 7*a* and the lower concave parts 7*b* may be at least one. They are normally formed in the range of about 2 to 6 pieces, preferably 2 to 4 pieces per side face, from the viewpoints of avoiding strength deterioration of the insert 1, and reducing the cutting resistance. The number of the upper concave parts 7*a* and the number of the lower concave parts 7*b* are preferably the same for each side face, from the viewpoint of a uniform wear amount of each cutting edge during cutting.

Figure 3:
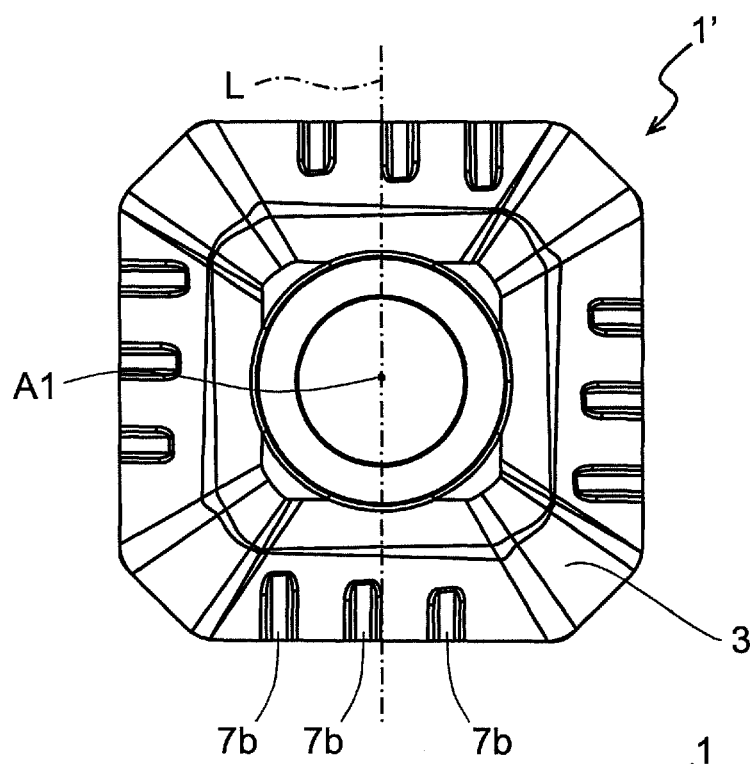
FIG. 3(a) is a diagram showing the cutting insert shown in FIG. 1 after reversal.
FIG. 3(b) is a diagram showing the insert before reversal.
Figure 3:
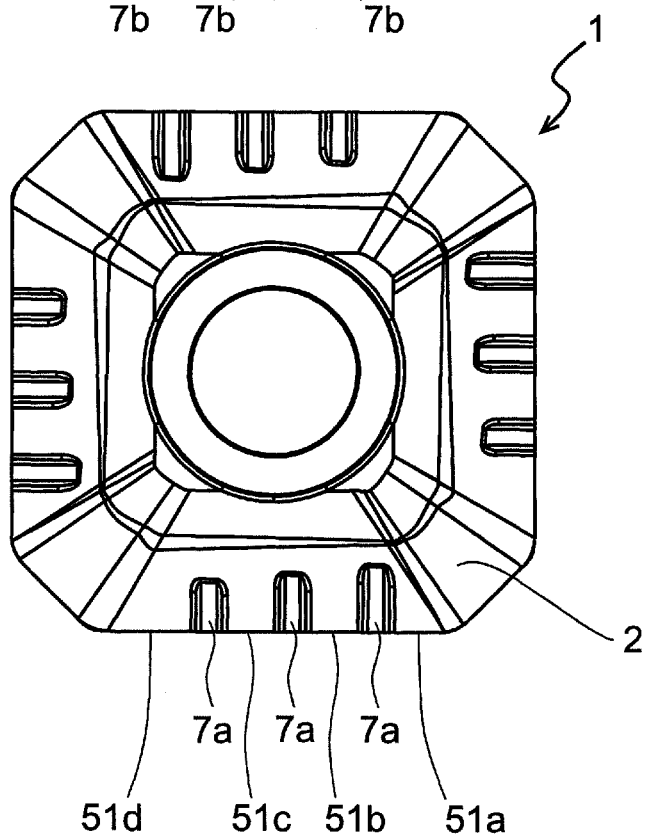

As shown in FIGS. 2(*b*) and 3(*a*), when reversed by using a reference line L as an axis which passes through the intersection point P2 of diagonals of the side face 4, and is perpendicular to the central axis A1, at least one lower concave part 7*b* after the reversal overlaps, when viewed from above, with at least one of the plurality of divided upper cutting edges 51*a* to 51*d* before the reversal which are shown in FIG. 3(*b*). Specifically, when reversed using the reference line L as the axis, the entire length of a straight line connecting the intersection of the aforementioned at least one lower concave part 7*b* and one divided lower cutting edge adjacent to this lower concave part 7*b*, and the intersection of the aforementioned at least one lower concave part 7*b* and the other divided lower cutting edge adjacent to this lower concave part 7*b* after the reversal overlaps with at least one of the plurality of divided upper cutting edges 51*a* to 51*d* before the reversal. Thereby, these divided upper cutting edges 51*a* to 51*d* and these divided lower cutting edges 61*a* to 61*d* act in a complementary manner to cut certain portions of the workpiece left uncut by the former cutting edges, and certain other portions of the workpiece left uncut by the latter cutting edges. Accordingly, the cutting without leaving any remaining uncut portion can be carried out only by the inserts 1 of a single kind. Especially, according to the inserts 1 of the present embodiment, the cutting without leaving any uncut portion can be achieved using the inserts 1 of a single kind by alternately disposing the upper face of one insert and the lower face of the other insert.

The inserts 1 of the present embodiment further have the following construction that, when reversed using the reference line L as the axis, the aforementioned at least one lower concave part 7*b* after the reversal is located with a gap alternately, when viewed from above, with respect to at least one upper concave part 7*a* before the reversal. That is, when reversed using the reference line L as the axis, the aforementioned at least one lower concave part 7*b* is disposed so as not to overlap with the aforementioned at least one upper concave part 7*a* before the reversal, when viewed from above. Even with this construction, by disposing the insert 1 before the reversal shown in FIG. 3(*b*), and the insert 1 after the reversal shown in FIG. 3(*a*) (hereinafter referred to as "reversed insert 1'") along the same circumference of the holder 91, belt-shaped uncut portions generated by the upper concave part 7a of the insert 1 can be cut by the lower cutting edge 6 of the reversed insert 1'.

When viewed from above, the upper concave part 7a and the lower concave part 7b are preferably disposed on each side face 4 so as to be rotationally symmetrical with reference to the central axis A1 extending perpendicularly in the thickness direction of the body part. Specifically, the upper concave part 7a and the lower concave part 7b formed in each side face 4 are disposed to become the same when viewed from the side. This reduces variations in the life of the cutting edges of the insert 1 and the reversed insert 1', thereby allowing all the inserts used for the cutting tool to be replaced at substantially the same time.

The upper concave part 7a includes a plurality of first upper concave portions 71a located in the first side face 41, and a plurality of second upper concave portions 72a located in the second side face 42, as shown in FIG. 1. When viewed from above, these first upper concave portions 71a and these second upper concave portions 72a are rotationally symmetrical with reference to the central axis A1. The number of these first upper concave portions 71a and the number of these second upper concave portions 72a are the same. Other constructions of the first upper concave portions 71a and the second upper concave portions 72a are similar to those of the upper concave parts 7a.

The thick part 8 is continuous in the width direction of the side face 4, namely, in the direction to connect both ends of the side face 4, and has a role in ensuring the wall thickness of the insert 1 in the side face 4. The conventional problem occurred in the case of forming the groove part extending from the upper face to the lower face, that is, the fracture resistance deterioration of the insert can be reduced by including the thick part 8. In the present embodiment, the entire flat surface of the side face 4 except for the upper concave parts 7a and the lower concave parts 7b corresponds to the thick part 8. Preferably, the length of the thick part 8 in the width direction of the side face 4 is larger than the distance between the two adjacent upper concave parts 7a, or the distance between the two adjacent lower concave parts 7b. The above effects can be exhibited sufficiently by the thick part 8 being continuous over such a length.

The thick part 8 may be continuous in the width direction of the side face 4, and may correspond to a portion capable of ensuring the wall thickness of the insert 1, as described above. Specifically, as shown in FIG. 4(a), D1 and D2 have a relationship of D1=D2 where D1 is the distance between the thick part 8 and the central axis A1 on a first straight line L1 which passes through the thick part 8, and is perpendicular to the central axis A1, and D2 is the distance between the upper cutting edge 5 and the central axis A1 on a second straight line L2 which passes through the upper cutting edge 5, and is perpendicular to the central axis A1. The first straight line L1 and the second straight line L2 are parallel to each other. The insert 1 having excellent fracture resistance can be obtained by satisfying the above relationship. Alternatively, the thick part 8 may protrude outwards than the upper cutting edge 5. That is, the D1 and the D2 may have a relationship of D1>D2. This case further improves the fracture resistance of the insert 1.

No specific limitation is imposed on the length in the thickness direction of the thick part 8. For example, the thick part 8 may be formed by a line or plane in the width direction of the side face 4. In an example of linearly forming the thick part 8, the upper concave part 7a and the lower concave part 7b respectively have a shallow depth at a central region in the thickness direction of the side face 4, and reach their respective terminal portions (the lower end portion 7a1 and the upper end portion 7b1), so that both terminal portions become substantially integral with each other.

Figure 4:
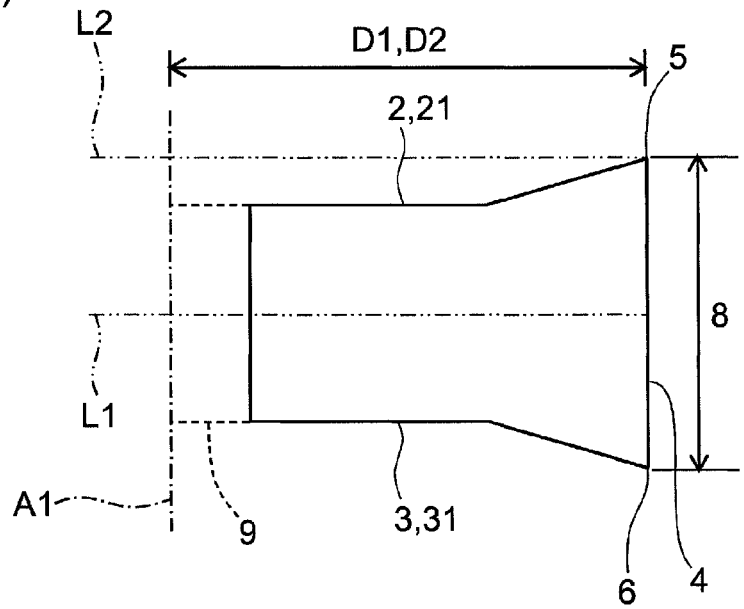
FIG. 4(a) is a sectional view taken along the line A-A of FIG. 2(a)
FIG. 4(b) is a sectional view taken along the line B-B of FIG. 2(a)
Figure 4:
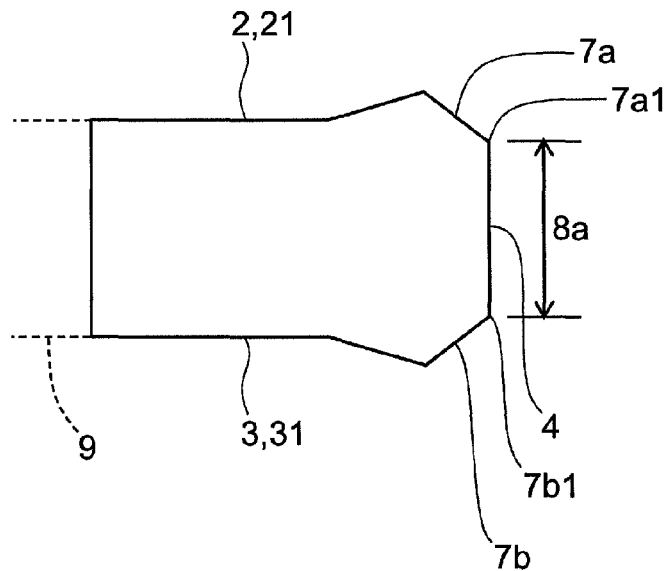

The thick part 8 is preferably formed by a plane, from the viewpoint of obtaining excellent fracture resistance. Specifically, as shown in FIGS. 1 and 4, the upper cutting edge 5 includes a linear portion (a main cutting edge portion 51 and a sub cutting edge portion 52). The linear portion is located on an extension line along the thickness direction of a planar portion 8a. A cross section which includes the central axis A1 and is parallel to the linear portion, and the planar portion 8a are parallel to each other. This reduces the fracture resistance deterioration due to a decrease in the wall thickness of the insert 1.

It is more preferably to include a plane formed linearly in the width direction of the side face 4. As shown in FIGS. 2(b) and 4(b), in the present embodiment, the thick part 8 is formed to include the linear (belt-shaped) planar portion 8a (a flat surface) between the upper concave part 7a and the lower concave part 7b. That is, when viewed from the side, the thick part 8 includes a linear region extending linearly from one end to the other end in the width direction of the first side face 41.

The length in the thickness direction of the thick part 8 is preferably set to be larger than the maximum value of the length in the thickness direction of the upper concave part 7a and the lower concave part 7b when viewed from the side. For example, a comparison may be made by using the sum of the maximum value of the length of the upper concave part 7a and the maximum value of the length of the lower concave part 7b, as the maximum value of the lengths of the upper concave part 7a and the lower concave part 7b.

From the viewpoint of obtaining more excellent fracture resistance, the thick parts 8 located on the side faces 4 are preferably continuous with each other. Specifically, each thick part 8 includes a first thick portion 81 located on the first side face 41, and a second thick portion 82 located on the second side face 42, as shown in FIG. 1. The first thick portion 81 and the second thick portion 82 are continuous with each other along the width direction.

The thick part 8 is preferably formed with respect to one side face 4 at the following ratio. That is, the thick part 8 is preferably formed at the ratio of 60% or more, preferably 60 to 80%, with respect to the entirety of the single side face 4 before forming the upper concave parts 7a, the lower concave parts 7b, and the thick part 8. This ensures the wall thickness of the insert 1.

The upper face 2 includes a first planar region 21 around the through hole 9, as shown in FIG. 4(b). In a cross section that includes the central axis A1 of the body part, and is perpendicular to the upper cutting edge 5, the first planar region 21 is positioned higher than the lower end portion 7a1. Thereby, the upper concave portion 7a can be largely ensured, and machining can be performed by increasing the feed rate per blade. The lower face 3 includes a second planar region 31 around the through hole 9. In the aforementioned cross section, the second planar region 31 is positioned lower than the upper end portion 7b1. Thereby, the lower concave portion 7b can be largely ensured, and machining can be performed by increasing the feed rate per blade.

As shown in FIG. 4(a), the first planar region 21 is positioned lower than the upper cutting edge 5. Thereby, the rake angle of the upper cutting edge 5 can be largely ensured. In the aforementioned cross section, the second planar region 31 is positioned higher than the lower cutting edge 6. Thereby, the rake angle of the lower cutting edge 6 can be largely ensured.

<Cutting Tool>

Figure 5:
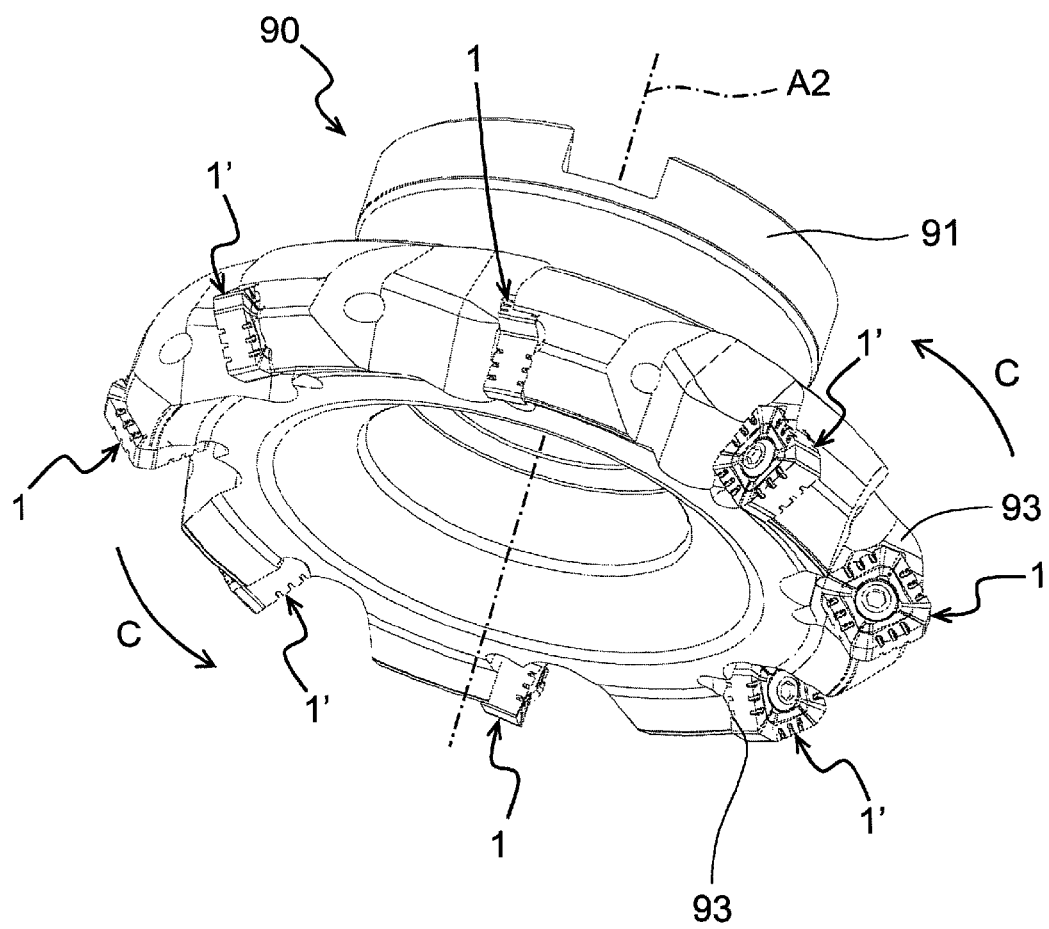
FIG. 5 is a general perspective view showing a cutting tool according to an embodiment of the present invention.
Figure 6:
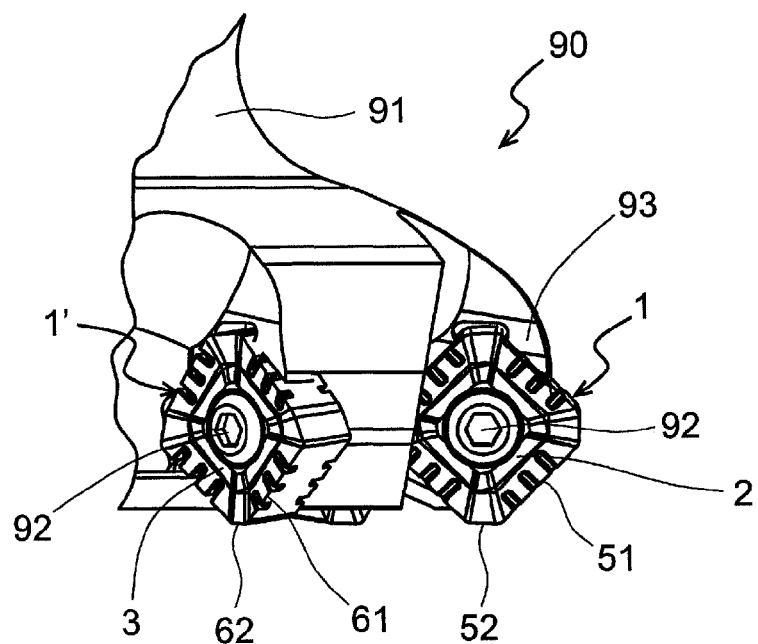
FIGS. 6(a) and 6(b) are partially enlarged side views showing the vicinity of a peripheral front end of the cutting tool shown in FIG. 5.
Figure 6:
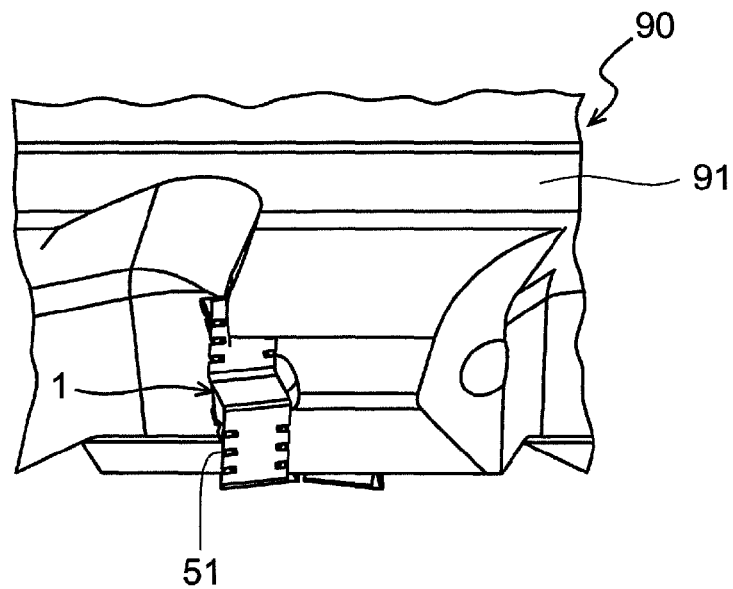

An embodiment of the cutting tool according to the present invention is described in detail with reference to FIGS. 5 and 6. As shown in FIGS. 5 and 6(a), the cutting tool 90 of the present embodiment includes a plurality of inserts 1 described above, and the holder 91 to which these inserts 1 are attached.

A plurality of insert pockets 93 are formed in the peripheral front end portion of the holder 91. These inserts 1 are respectively attached to peripheral positions within these insert pockets 93. Specifically, these inserts 1 are attached with their respective upper faces (rake faces) 2 facing in the rotation direction indicated by the arrow C, so that the main cutting edge portion 51 is located at the outermost periphery. In the cutting tool 90, the main cutting edge portion 51 performs cutting by rotating the holder 91 in the direction indicated by the arrow C.

As shown in FIG. 6(b), in the cutting tool 90, these inserts 1 are attached to the holder 91 so as to have a positive axial rake angle with these inserts 1 attached thereto, specifically, so that the sub cutting edge portion 52 of each insert 1 is perpendicular to the central axis A2 of the holder 91.

The cutting tool 90 has these inserts 1, whose main cutting edge portions are arranged differently, attached along the same circumference of the holder 91. Two inserts 1 and 1 among the plurality of inserts 1 are attached to the holder 91 in a state where their respective upper faces 2 and their respective lower faces 3 are positioned oppositely. That is, the insert 1 whose upper face 2 is oriented in the rotation direction along the same circumference of the holder 91, and the reversed insert 1' whose lower face 3 is oriented in the rotation direction, are alternately arranged. Then, the insert 1 and the reversed insert 1' are fixed to the holder 91 by respectively inserting the attachment screws 92 (fixing members) into the through holes 9 of the insert 1 and the reversed insert 1', and by screwing them into the holder 91. Consequently, the belt-shaped uncut portions generated by the upper concave parts 7a of the insert 1 can be cut by the lower cutting edge 6 (the main cutting edge portion 61) of the reversed insert 1', thus permitting the cutting (machining) without leaving the uncut portions. The number of the inserts arrangeable along the same circumference may be at least one for each of the insert 1 and the reversed insert 1'. Preferably, the number of the inserts is usually a multiple of 2.

<Method of Cutting Workpiece>

Figure 7:
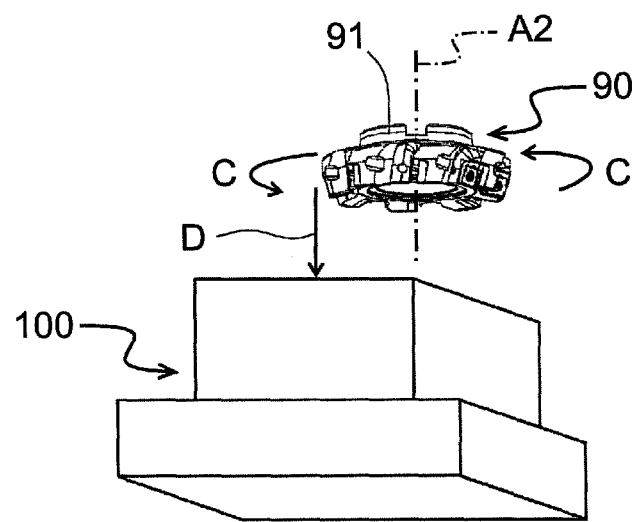
FIGS. 7(a) to 7(c) are process drawings showing a method of cutting a workpiece according to an embodiment of the present invention.
Figure 7:
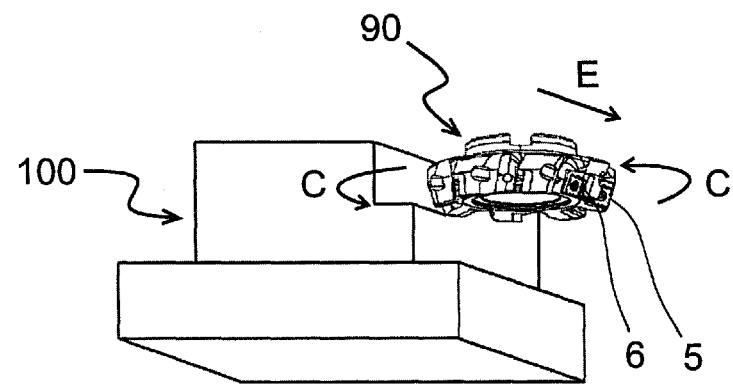
Figure 7:
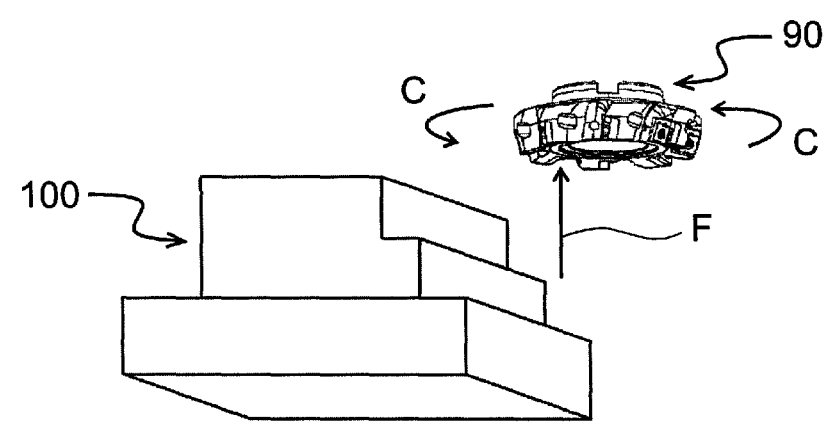

An embodiment of the method of cutting a workpiece according to the invention is described in detail with reference to FIG. 7. The method of cutting the workpiece of the present embodiment includes the following steps (i) to (iii):

(i) bringing the cutting tool 90 near the workpiece 100 by rotating the cutting tool 90 in the direction indicated by the arrow C around the central axis A2 of the holder 91, and by moving the cutting tool 90 in the direction indicated by the arrow D, as shown in FIG. 7(a);

(ii) cutting the workpiece 100 by bringing the upper cutting edge 5 and the lower cutting edge 6 of the rotating cutting tool 90 into contact with the surface of the workpiece 100, and by moving the cutting tool 90 in the direction indicated by the arrow E, as shown in FIG. 7(b); and (iii) separating the cutting tool 90 from the workpiece 100 by moving the cutting tool 90 in the direction indicated by the arrow F, as shown in FIG. 7(c).

In the present embodiment, the workpiece 100 is cut by using the cutting tool 90 having the inserts 1 attached thereto. Therefore, in the step (ii), the cutting resistance during cutting can be reduced, and the chatter vibration during machining can be reduced. The machining can be carried out with the inserts of a single kind, without leaving any uncut portion.

In the step (i), either the cutting tool 90 or the workpiece 100 may be rotated. The cutting tool 90 and the workpiece 100 may come relatively close to each other. For example, the workpiece 100 may be brought near the cutting tool 90. Similarly, in the step (iii), the workpiece 100 and the cutting tool 90 may be relatively separated from each other. For example, the workpiece 100 may be separated from the cutting tool 90. When the cutting (machining) is continued, the step of bringing the upper cutting edge 5 and the lower cutting edge 6 of the cutting tool 90 into contact with different portions of the workpiece 100 may be repeated while retaining the rotation of the cutting tool 90. When the upper cutting edge 5 and the lower cutting edge 6 in use are worn, the unused upper cutting edge 5 and the unused lower cutting edge 6 may be used by allowing the insert 1 and the reversed insert 1' to rotate 90 degrees with respect to the central axis A1 of the through hole 9.

While the several embodiments according to the present invention have been described and illustrated above, it is to be understood that the present invention is not limited to these embodiments, and is applicable to optional ones without departing from the gist of the present invention.

Figure 8:
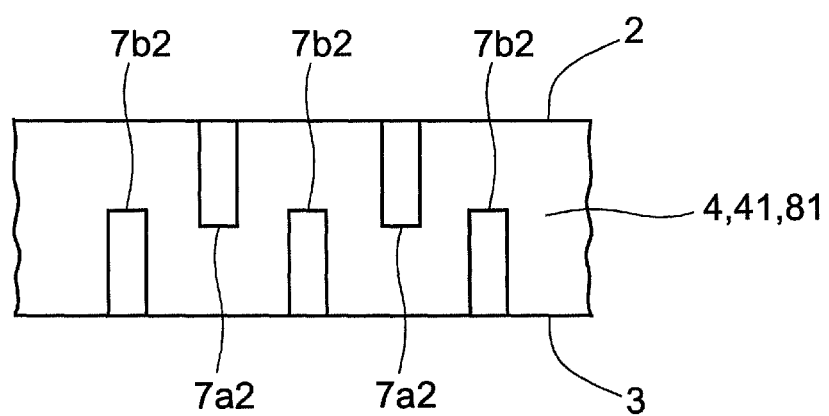
FIGS. 8(a) and 8(b) are partially enlarged side views showing the vicinity of a side face of a cutting insert according to other embodiment of the present invention.
Figure 8:
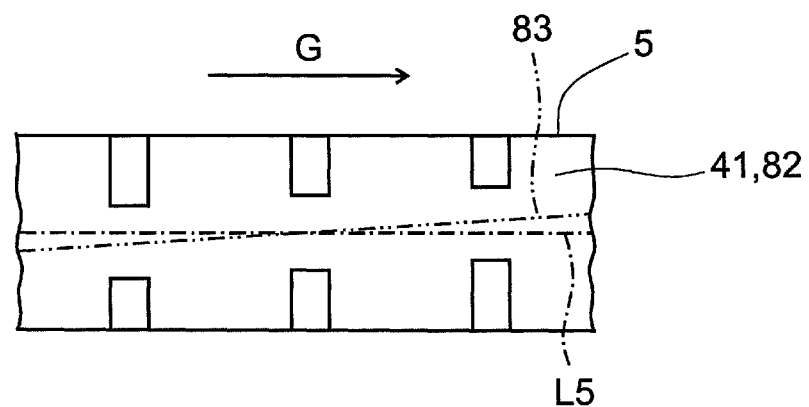

For example, in the inserts according to the aforementioned one embodiment, the description has been given of the case where the lower end portion of the upper concave part is located closer to the upper face than the upper end portion of the lower concave part, when viewed from the side. Alternatively, the lower end portion of the upper concave part may be located closer to the lower face than the upper end portion of the lower concave part. For example, as shown in FIG. 8(a), in the positional relationship between the lower end portion $7a2$ and the upper end portion $7b2$ located on the side face 4 and the first side face 41, the lower end portion $7a2$ is located closer to the lower face 3 than the upper end portion $7b2$, when viewed from the side. A thick part 81 according to this embodiment includes a curved region extending in the shape of a wave from one end to the other end in the width direction of the first side face 41. Also in the insert of this embodiment, the thick part 8 is continuous along the width direction of the side face 4, thus producing the same effects as the inserts of the aforementioned one embodiment. Particularly, the lengths of the upper concave part 7a and the lower concave part 7b can be further increased, thus making it possible to further improve chip discharging performance. Other constructions are similar to those of the insert 1 according to the aforementioned one embodiment.

As shown in FIG. 2(b), the linear region of the thick part according to the aforementioned one embodiment is parallel to a fifth straight line passing through both the midpoint in one end in the width direction of the first side face 41 and the midpoint in the other end in the width direction of the first side face 41. Alternatively, the linear region may be inclined with respect to the fifth straight line. For example, as shown in FIG. 8(b), a linear region 83 of the thick part 82 is inclined to come closer to the upper cutting edge 5 with respect to the fifth straight line L5, in the direction indicated by the arrow G, namely, from the sub cutting edge portion to the main cutting edge portion when viewed from the side. This ensures the groove clearance amount according to the clearance angle during attachment to the holder. Other constructions are similar to those of the insert 1 according to the aforementioned one embodiment.

The invention claimed is:

1. A cutting insert, comprising:
an upper face;
a lower face;
a side face located between the upper face and the lower face;
an upper cutting edge located at an intersection of the upper face and the side face; and
a lower cutting edge located at an intersection of the lower face and the side face,
the cutting insert further comprising:
a through hole extending from the upper face to the lower face, wherein the upper face has a substantially polygonal shape, the side face comprises a first side face and a second side face adjacent to the first side face,
the first side face comprises:
at least one upper concave part which extends to the upper face along a thickness direction, and divides the upper cutting edge into a plurality of divided upper cutting edges; and
at least one lower concave part which extends to the lower face along the thickness direction, and divides the lower cutting edge into a plurality of divided lower cutting edges,
the at least one upper concave part and the at least one lower concave part are separated from each other through a thick part being continuous along a width direction of the side face,
when reversed by using a reference line as an axis which passes through the intersection point of diagonals of the side face and which is perpendicular to the central axis of the cutting insert, the at least one lower concave part after the reversal overlaps with at least one of the plurality of divided upper cutting edges before the reversal in a top view, and the thick part comprises a curved region extending in the shape of a wave from one end to the other end in the width direction of the first side face in a side view.

2. The cutting insert according to claim 1, wherein the at least one upper concave part comprises at least one first upper concave portion located on the first side face and at least one second upper concave portion located on the second side face, and the at least one first upper concave portion and the at least one second upper concave portion are rotationally symmetrical around the central axis in a top view.

3. The cutting insert according to claim 1, wherein the upper cutting edge extends along a whole circumference of the upper face, the side face comprises a plurality of divided side faces respectively connected to each of sides of the substantially polygonal shape of the upper face, a plurality of the upper concave parts are provided, and at least one of the plurality of upper concave portions is located on the plurality of divided side faces, respectively.

4. A cutting tool, comprising:
a cutting insert according to claim 1; and
a holder configured to attach the cutting insert thereto.

5. A method of cutting a workpiece, comprising:
rotating a cutting tool according to claim 4;
bringing the upper cutting edge or the lower cutting edge of the rotating cutting tool into contact with a surface of the workpiece; and
separating the cutting tool from the workpiece.

6. A cutting insert, comprising:
an upper face;
a lower face;
a side face located between the upper face and the lower face;
an upper cutting edge located at an intersection of the upper face and the side face; and
a lower cutting edge located at an intersection of the lower face and the side face, wherein
the upper face has a substantially polygonal shape,
the side face comprises a first side face and a second side face adjacent to the first side face, the first side face comprises:
at least one upper concave part which extends to the upper face along a thickness direction, and divides the upper cutting edge into a plurality of divided upper cutting edges; and
at least one lower concave part which extends to the lower face along the thickness direction, and divides the lower cutting edge into a plurality of divided lower cutting edges,
the at least one upper concave part and the at least one lower concave part are separated from each other through a thick part being continuous along a width direction of the side face,
when reversed by using a reference line as an axis which passes through the intersection point of diagonals of the side face and which is perpendicular to the central axis of the cutting insert, the at least one lower concave part after the reversal overlaps with at least one of the plurality of divided upper cutting edges before the reversal in a top view,
the thick part comprises a curved region extending in the shape of a wave from one end to the other end in the width direction of the first side face in a side view, and S1 and S2 have a relationship of S1>S2, where S1 is a minimum dimension of the upper face on a third straight line perpendicular to the central axis in a top view, and S2 is a minimum dimension of the side face on a fourth straight line parallel to the central axis in a side view.

7. A cutting tool, comprising:
a cutting insert according to claim 6; and
a holder configured to attach the cutting insert thereto.

8. A method of cutting a workpiece, comprising:
rotating a cutting tool according to claim 7;
bringing the upper cutting edge or the lower cutting edge of the rotating cutting tool into contact with a surface of the workpiece; and
separating the cutting tool from the workpiece.

9. A cutting insert, comprising:
an upper face;
a lower face;
a side face located between the upper face and the lower face;
an upper cutting edge located at an intersection of the upper face and the side face; and
a lower cutting edge located at an intersection of the lower face and the side face, wherein the side face comprises:
at least one upper concave part which extends to the upper face along a thickness direction, and divides the upper cutting edge into a plurality of divided upper cutting edges; and
at least one lower concave part which extends to the lower face along the thickness direction, and divides the lower cutting edge into a plurality of divided lower cutting edges,
the at least one upper concave part and the at least one lower concave part are separated from each other through a thick part being continuous along a width direction of the side face, when reversed by using a reference line as an axis which passes through the intersection point of diagonals of the side face and which is perpendicular to the central axis of the cutting insert, the at least one lower concave part after the reversal is located with a gap alternately-with the at least one upper concave part before the reversal in a top view, the at least one upper concave part comprises a lower end portion located on the side face, the at least one lower concave part comprises an upper end portion located on the side face, and the lower end portion is located closer to the upper face than the upper end portion in a side view.

10. The cutting insert according to claim 9, wherein a color of the upper face and a color of the lower face are different from each other.

11. The cutting insert according to claim 10, wherein the upper face has a substantially polygonal shape, and the side face comprises a first side face, and a second side face adjacent to the first side face.

12. The cutting insert according to claim 9, wherein the upper face has a substantially polygonal shape, and the side face comprises a first side face and a second side face adjacent to the first side face.

13. The cutting insert according to claim 12, wherein, in a side view, the thick part comprises a linear region extending linearly from one end to the other end in a width direction of the first side face.

14. The cutting insert according to claim 13, wherein, in a side view, the linear region of the thick part is inclined with respect to a straight line passing through both a midpoint at one end in the width direction of the first side face and a midpoint at the other end in the width direction of the first side face.

15. The cutting insert according to claim 14, wherein the thick part comprises a first thick portion located on the first side face and a second thick portion located on the second side face, and the first thick portion and the second thick portion are continuous with each other along the width direction.

16. A cutting tool, comprising:

a plurality of cutting inserts according to claim 9; and a holder configured to attach the plurality of cutting inserts thereto, wherein two of the plurality of cutting inserts are attached to the holder in a state where their respective upper faces and their respective lower faces are positioned oppositely, and when viewed along the same circumference of the holder, the at least one lower concave part of one of these two cutting inserts after the reversal is located with a gap alternately with the at least one upper concave part of the other of these two cutting inserts before the reversal.

17. A method of cutting a workpiece, comprising:

rotating a cutting tool according to claim 16;

bringing the upper cutting edge or the lower cutting edge of the rotating cutting tool into contact with a surface of the workpiece; and separating the cutting tool from the workpiece.

18. A cutting tool, comprising:

a cutting insert according to claim 9; and a holder configured to attach the cutting insert thereto.

19. A method of cutting a workpiece, comprising:

rotating a cutting tool according to claim 18;

bringing the upper cutting edge or the lower cutting edge of the rotating cutting tool into contact with a surface of the workpiece; and separating the cutting tool from the workpiece.

* * * * *